US012540263B2

United States Patent
Zheng et al.

(10) Patent No.: US 12,540,263 B2
(45) Date of Patent: *Feb. 3, 2026

(54) ROOFING PUTTY, METHODS AND SYSTEMS UTILIZING THE SAME

(71) Applicant: BMIC LLC, Dallas, TX (US)

(72) Inventors: Yan Zheng, Livingston, NJ (US); Yixi Xiao, Edison, NJ (US)

(73) Assignee: BMIC LLC, Dallas, TX (US)

( * ) Notice: Subject to any disclaimer, the term of this patent is extended or adjusted under 35 U.S.C. 154(b) by 276 days.

This patent is subject to a terminal disclaimer.

(21) Appl. No.: 17/680,740

(22) Filed: Feb. 25, 2022

(65) Prior Publication Data

US 2022/0267654 A1 Aug. 25, 2022

Related U.S. Application Data

(60) Provisional application No. 63/153,797, filed on Feb. 25, 2021.

(51) Int. Cl.
| | |
|---|---|
| *C09J 183/04* | (2006.01) |
| *C09J 5/00* | (2006.01) |
| *C09J 11/04* | (2006.01) |
| *C09J 11/08* | (2006.01) |
| *E04D 13/14* | (2006.01) |

(52) U.S. Cl.
CPC ............... *C09J 183/04* (2013.01); *C09J 5/00* (2013.01); *C09J 11/04* (2013.01); *C09J 11/08* (2013.01); *E04D 13/14* (2013.01); *C09J 2401/00* (2013.01); *C09J 2483/00* (2013.01)

(58) Field of Classification Search
CPC ... C09J 183/04; C09J 5/00; C09J 11/04; C09J 11/08; C09J 2401/00; C09J 2483/00; E04D 13/14; C08G 77/16; C08G 77/18; C09D 183/04

USPC ........................................................ 428/447
See application file for complete search history.

(56) References Cited

U.S. PATENT DOCUMENTS

| | | | |
|---|---|---|---|
| 9,284,454 B2 | 3/2016 | Delehanty et al. | |
| 2018/0016404 A1* | 1/2018 | Tselepis | C08L 83/04 |
| 2020/0256053 A1 | 8/2020 | Sealock et al. | |

FOREIGN PATENT DOCUMENTS

| | | | | |
|---|---|---|---|---|
| CN | 110520479 A | * | 11/2019 | C08G 77/20 |
| DE | 19639058 A1 | * | 3/1997 | E04D 13/1471 |
| RO | 120280 B1 | * | 11/2005 | |

OTHER PUBLICATIONS

RO120280B1English machine translation (2005).*
DE19639058A1 English machine translation (1997).*
CN110520479A English machine translation (2019).*

* cited by examiner

*Primary Examiner* — Callie E Shosho
*Assistant Examiner* — Steven A Rice
(74) *Attorney, Agent, or Firm* — GREENBERG TRAURIG, LLP

(57) ABSTRACT

Some embodiments of the present disclosure relate to a roofing putty. In some embodiments, the roofing putty is a formulation that comprises at least one polysiloxane, at least one silane, and at least one filler. Some embodiments of the present disclosure relate to a system comprising the roofing putty and at least one roof substrate. Some embodiments of the present disclosure relate to a method of using the roofing putty, such as, but not limited to, by disposing the roofing putty on at least one roof substrate.

10 Claims, 5 Drawing Sheets

ROOFING PUTTY, METHODS AND SYSTEMS UTILIZING THE SAME

RELATED APPLICATIONS

The present application claims priority to U.S. Provisional Application No. 63/153,797, filed on Feb. 25, 2021, and titled "ROOFING PUTTY, METHODS AND SYSTEMS UTILIZING THE SAME," the entire contents of which are hereby incorporated by reference.

FIELD

The present disclosure relates to the field of roofing putties.

BACKGROUND

In both commercial and residential roofing applications, a good portion of labor costs, material costs, or combinations thereof are spent dealing with applying materials to a roof substrate or multiple roof substrates. For instance, installation of step flashing between penetrations defined by multiple roof substrates may be time consuming and require special knowledge about water flows. Simplified, user friendly, easy, fast, straightforward and error forgiving solutions to various roofing installation issues are therefore needed.

SUMMARY

In some embodiments, a roofing system includes a first roof substrate, a protruding member, and a roofing putty. In some embodiments, the protruding member protrudes from the first roof substrate. In some embodiments, the roofing putty is present on the first roof substrate and the protruding member at an interface between the first roof substrate and the protruding member. In some embodiments, the roofing putty is a formulation that includes at least one polysiloxane; at least one filler; and at least one silane. In some embodiments, the roofing putty exhibits an elongation ranging from 90% to 500%, tested according to ASTM D2370.

In some embodiments, the at least one polysiloxane is present in the roofing putty in an amount ranging from 50 wt. % to 70 wt. % based on a total weight of the roofing putty.

In some embodiments, the at least one filler and the at least one silane are present in the roofing putting in a weight ratio of the at least one filler to the at least one silane ranging from 1:1 to 3:1.

In some embodiments, the roofing system includes a second roof substrate. In some embodiments, the second roof substrate is parallel to the first roof substrate. In some embodiments, the roofing putty is disposed between the second roof substrate and the first roof substrate.

In some embodiments, the protruding member is transverse to the first roof substrate, wherein the roofing putty is present on an interface between the first roof substrate and the protruding member.

In some embodiments, the first roof substrate is a plywood roof substrate, a glass roof substrate, a cellulosic roof substrate, a roofing shingle, a glass mat, a fiberglass mat, an underlayment, a roofing membrane, a roof deck, a photovoltaic (PV) panel, a modified bitumen (MODBIT) substrate, a roll good, a polyisocyanurate (ISO) foam board, or any combination thereof.

In some embodiments, the at least one polysiloxane of the roofing putty is a mono-trimethoxy terminated polysiloxane, a silanol terminated polysiloxane, or any combination thereof.

In some embodiments, the at least one polysiloxane of the roofing putty is a hydroxy terminated polysiloxane, a di-hydroxy terminated polysiloxane, a vinyl terminated polysiloxane, a di-vinyl terminated polysiloxane, a tri-methylsilyl terminated polysiloxane or any combination thereof.

In some embodiments, the at least one polysiloxane has a viscosity of 70 cP to 300,000 cP tested according to 70 cP to 300,000 cP tested according to ASTM 2196 at a temperature ranging from 20° C. to 25° C.

In some embodiments, the roofing putty includes the at least one filler in an amount ranging from 15% to 30 wt % based on a total weight of the roofing putty.

In some embodiments, the at least one filler is a reinforcing filler, a space filler, or any combination thereof. In some embodiments, the reinforcing filler is fumed silica, microcellulose fibers, or any combination thereof. In some embodiments, the reinforcing filler is ground silica, polymer fibers, kaolin, or any combination thereof. In some embodiments, the space filler includes hollow glass microspheres. In some embodiments, the hollow glass microspheres have an average particle size ranging from 1 micron to 200 microns. In some embodiments, the space filler includes polymer microspheres, sand, granules, extended perlite, expanded polystyrene, beads, saw dust, flyash, pulp, polymer grains, polymer flakes, rice hulls, or any combination thereof.

In some embodiments, a method includes obtaining a roofing putty; and disposing the roofing putty on a first roof substrate and a protruding member at an interface between the first roof substrate and the protruding member. In some embodiments, the protruding member protrudes from the first roof substrate. In some embodiments, the roofing putty is a formulation that includes at least one polysiloxane; at least one filler; and at least one silane. In some embodiments, the roofing putty exhibits an elongation ranging from 90% to 500%, tested according to ASTM D2370.

In some embodiments, the method includes sandwiching the roofing putty between the first roof substrate and a second roof substrate, wherein the second roof substrate is parallel to the first roof substrate.

In some embodiments, the protruding member is transverse to the first roof substrate.

In some embodiments, the at least one polysiloxane is present in the roofing putty in an amount ranging from 50 wt. % to 70 wt. % based on a total weight of the roofing putty. In some embodiments, the at least one filler and the at least one silane are present in the roofing putting in a weight ratio of the at least one filler to the at least one silane ranging from 1:1 to 3:1.

Some embodiments of the present disclosure relate to a roofing putty.

In some embodiments, the roofing putty is a formulation that comprises at least one polysiloxane, at least one silane, and at least one filler. In some embodiments, the at least one polysiloxane is present in an amount ranging from 50 wt % to 70 wt % based on a total weight of the roofing putty. In some embodiments, the at least one filler and the at least one silane are present in the roofing putty in a weight ratio of the at least one filler to the at least one silane ranging from 1:1 to 3:1. In some embodiments, the roofing putty exhibits an elongation ranging from 90% to 500% tested according to ASTM D2370.

Some embodiments of the present disclosure relate to a system comprising the roofing putty and at least one roof substrate.

Some embodiments of the present disclosure relate to a method of using the roofing putty, such as, but not limited to, by disposing the roofing putty on at least one roof substrate.

Covered embodiments are defined by the claims, not the above summary. The above summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Figure 1:
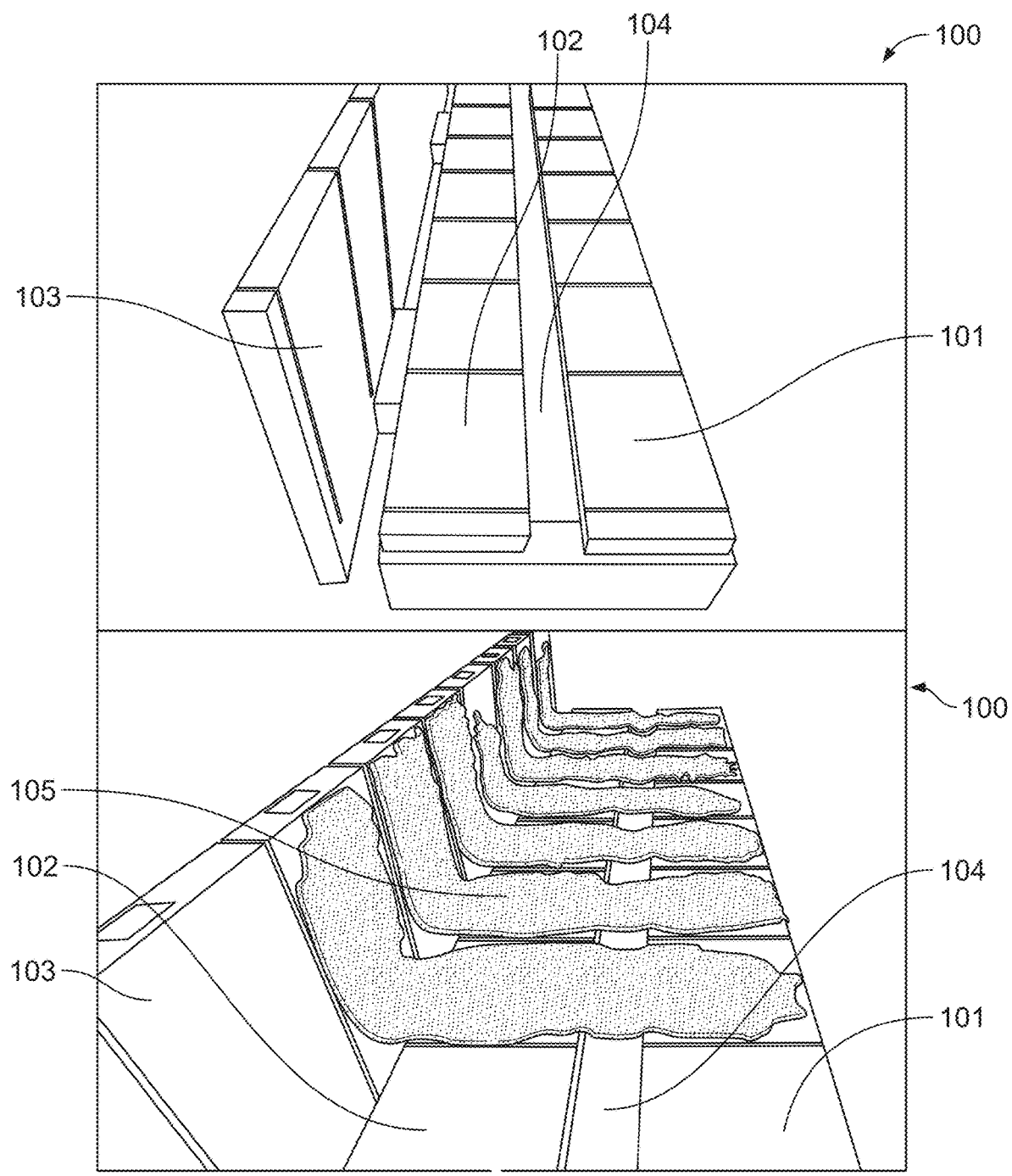
FIG. 1 depicts a non-limiting embodiment of a roofing system including a roofing putty.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Some embodiments of the present disclosure relate to a roofing putty.

As used herein, the term "putty" refers to a solid, moldable material that has a consistency similar in texture to clay or dough. In some non-limiting embodiments, to determine whether a given material is a "putty," the consistency of the material may be evaluated after 12 to 24 hours of storage in a container filled with nitrogen.

As used herein, a "roofing putty" is a putty that has at least one characteristic that makes the putty configured for use on at least one roof substrate. An exemplary characteristic of a roofing putty includes, but is not limited to, a tensile strength characteristic of the roofing putty, an elongation characteristic of the roofing putty, a tear characteristic of the roofing putty, or any combination thereof. Exemplary ranges and ASTM test methods for determining exemplary characteristics relating to tensile strength, elongation and tear are described herein.

In some embodiments, a roofing putty as described herein may be a formulation comprising, consisting of, or consisting essentially of ethylene propylene diene monomer ("EPDM") rubber.

In some embodiments, a roofing putty as described herein may be a formulation comprising, consisting of, or consisting essentially of polyurethane ("PU").

In some embodiments, a roofing putty as described herein may be a formulation comprising, consisting of, or consisting essentially of any other suitable material or any combination of suitable materials.

In some embodiments, a roofing putty as described herein may be a formulation comprising, consisting of, or consisting essentially of at least one polysiloxane, at least one silane and at least one filler.

As used herein, a "polysiloxane" is a polymer that includes at least two of the following repeat units: —$R_2$Si—O—Si$R_2$—, where R is an organic group, or hydrogen. As used herein an "organic group" may encompass any organosilicon group, such as but not limited to a silanol group or an alkyl silyl group. In some embodiments, a polysiloxane may include ten or more of the aforementioned repeat units. In some embodiments, a polysiloxane may include hundreds of the aforementioned repeat units. In some embodiments, a polysiloxane may include thousands of the aforementioned repeat units. In some embodiments, a polysiloxane may include tens-of-thousands of the aforementioned repeat units. In some embodiments, a polysiloxane may include hundreds-of-thousands of the aforementioned repeat units. In some embodiments, a polysiloxane may include millions of the aforementioned repeat units. As used herein, a "polysiloxane" may also include any version of the aforementioned formula where at least one of the R groups is substituted with an organic group. In some embodiments, the polysiloxane is unsubstituted, such that all of the R groups may be the same. In some embodiments, the polysiloxane is substituted such that some of the R groups may be the same while others may differ from each other. In some embodiments, the polysiloxane is substituted such that all of the R groups are different. In some embodiments, the polysiloxane is substituted or "terminated" with an organic group at the end of a polymer chain.

In some embodiments, the at least one polysiloxane is present in the roofing putty in an amount ranging from 50 wt % to 70 wt % based on a total weight of the roofing putty. In some embodiments, the at least one polysiloxane is present in the roofing putty in an amount ranging from 55 wt % to 70 wt % based on a total weight of the roofing putty. In some embodiments, the at least one polysiloxane is present in the roofing putty in an amount ranging from 60 wt % to 70 wt % based on a total weight of the roofing putty. In some embodiments, the at least one polysiloxane is present in the roofing putty in an amount ranging from 65 wt % to 70 wt % based on a total weight of the roofing putty. In some embodiments, the at least one polysiloxane is present in the roofing putty in an amount ranging from 50 wt % to 65 wt % based on a total weight of the roofing putty. In some embodiments, the at least one polysiloxane is present in the roofing putty in an amount ranging from 50 wt % to 60 wt % based on a total weight of the roofing putty. In some embodiments, the at least one polysiloxane is present in the roofing putty in an amount ranging from 50 wt % to 55 wt % based on a total weight of the roofing putty. In some embodiments, the at least one polysiloxane is present in the roofing putty in an amount ranging from 55 wt % to 65 wt % based on a total weight of the roofing putty. In some embodiments, the at least one polysiloxane is present in the roofing putty in an amount ranging from 55 wt % to 60 wt % based on a total weight of the roofing putty. In some embodiments, the at least one polysiloxane is present in the roofing putty in an amount ranging from 60 wt % to 65 wt % based on a total weight of the roofing putty.

In some embodiments, the at least one polysiloxane has a viscosity of 70 cP to 300,000 cP tested according to ASTM 2196 at a temperature ranging from 20° C. to 25° C. In some embodiments, the at least one polysiloxane has a viscosity of 100 cP to 300,000 cP tested according to ASTM 2196 at a temperature ranging from 20° C. to 25° C. In some embodiments, the at least one polysiloxane has a viscosity of 1000 cP to 300,000 cP tested according to ASTM 2196 at a temperature ranging from 20° C. to 25° C. In some embodiments, the at least one polysiloxane has a viscosity of 10,000 cP to 300,000 cP tested according to ASTM 2196 a at a temperature ranging from 20° C. to 25° C. In some embodiments, the at least one polysiloxane has a viscosity of 100,000 cP to 300,000 cP tested according to ASTM 2196 at a temperature ranging from 20° C. to 25° C.

In some embodiments, the at least one polysiloxane has a viscosity of 70 cP to 100,000 cP tested according to ASTM 2196 at a temperature ranging from 20° C. to 25° C. In some embodiments, the at least one polysiloxane has a viscosity of 70 cP to 10,000 cP tested according to ASTM 2196 at a temperature ranging from 20° C. to 25° C. In some embodiments, the at least one polysiloxane has a viscosity of 70 cP to 1000 cP tested according to ASTM 2196 at a temperature ranging from 20° C. to 25° C. In some embodiments, the at least one polysiloxane has a viscosity of 70 cP to 100 cP tested according to ASTM 2196 at a temperature ranging from 20° C. to 25° C.

In some embodiments, the at least one polysiloxane has a viscosity of 100 cP to 100,000 cP tested according to ASTM 2196 at a temperature ranging from 20° C. to 25° C. In some embodiments, the at least one polysiloxane has a viscosity of 1000 cP to 10,000 cP tested according to ASTM 2196 at a temperature ranging from 20° C. to 25° C.

In some embodiments, the at least one polysiloxane of the roofing putty comprises or is selected from the group consisting of a hydroxy terminated polysiloxane, a di-hydroxy terminated polysiloxane, a vinyl terminated polysiloxane, a di-vinyl terminated polysiloxane, a tri-methylsilyl terminated polysiloxane, a mono-trimethoxy terminated polysiloxane, a silanol terminated polysiloxane, or any combination thereof.

In some embodiments, the at least one polysiloxane of the roofing putty comprises, or is selected from the group consisting of a hydroxy terminated polysiloxane, a di-hydroxy terminated polysiloxane, a vinyl terminated polysiloxane, a di-vinyl terminated polysiloxane, a tri-methylsilyl terminated polysiloxane, or any combination thereof.

In some embodiments, the at least one polysiloxane of the roofing putty comprises or is selected from the group consisting of a mono-trimethoxy terminated polysiloxane, a silanol terminated polysiloxane, or any combination thereof.

In some embodiments, the at least one polysiloxane of the roofing putty comprises, consists, or consists essentially of a mono-trimethoxy terminated polysiloxane. In some embodiments, the at least one polysiloxane of the roofing putty comprises, consists, or consists essentially of a silanol terminated polysiloxane.

Turning to the at least one silane, as used herein, a "silane" is any compound having the general formula $Si_nR_{2n+2}$, where R is hydrogen, an organic group, or any combination thereof. As used herein, a "silane" may also include any version of the aforementioned formula where at least one of the R groups is substituted with an organic group. In some embodiments, the silane is unsubstituted, such that all of the R groups may be the same. In some embodiments, the silane is substituted such that some of the R groups may be the same while others may differ from each other. In some embodiments, the silane is substituted such that all of the R groups are different. Examples of at least one substituent R group may include, but is not limited to at least one amino group (in the non-limiting case of an aminosilane) and at least one methoxy group (in the non-limiting case of a methoxysilane).

In some embodiments, a silane may also encompass a bipodal silane. As used herein, a "bipodal silane" is a silane having the general formula $R_3Si$—R—$SiR_3$.

In some embodiments, the at least one silane is present in the roofing putty in an amount ranging from 5 wt % to 20 wt % based on a total weight of the roofing putty. In some embodiments, the at least one silane is present in the roofing putty in an amount ranging from 10 wt % to 20 wt % based on a total weight of the roofing putty. In some embodiments, the at least one silane is present in the roofing putty in an amount ranging from 15 wt % to 20 wt % based on a total weight of the roofing putty.

In some embodiments, the at least one silane is present in the roofing putty in an amount ranging from 5 wt % to 15 wt % based on a total weight of the roofing putty. In some embodiments, the at least one silane is present in the roofing putty in an amount ranging from 5 wt % to 10 wt % based on a total weight of the roofing putty.

In some embodiments, the at least one silane is present in the roofing putty in an amount ranging from 10 wt % to 15 wt % based on a total weight of the roofing putty.

In some embodiments, the at least one silane comprises or is selected from the group consisting of an associative silane, a non-associative silane, or any combination thereof. In some embodiments, the at least one silane comprises, consists, or consists essentially of an associative silane. In some embodiments, the at least one silane comprises, consists, or consists essentially of a non-associative silane.

As used herein, an "associative silane" is a silane having the general formula $Si(R1)_n(R2)_{n+2}$; where each R1 group is a crosslinkable functional group, such as but not limited to, an alkoxy group, acetoxy group, or an oxime group; and where at least one of the R2 groups is a functional group that interacts with another R2 group, interacts with another component in a given roofing putty formulation, or any combination thereof. In some embodiments, the interaction occurs by an interaction mechanism, such as but not limited to, hydrogen bonding, electrostatic attraction, π-π stacking, or any combination thereof.

As used herein a "non-associative silane" is any silane that is not an "associative silane."

In some embodiments, the associative silane comprises or is selected from the group consisting of an epoxysilane, an aminosilane, a diphenylsilane, or any combination thereof.

In some embodiments, the associative silane comprises or is selected from the group consisting of methacryloxypropyltrimethoxysilane, mercaptopropyltrimethoxysilane methacryloxypropylmethyldimethoxysilane, diphenyldimethoxysilane, an epoxy silane oligomer, glycidoxypropyltrimethoxysilane, aminoethylaminopropyltrimethoxysilane or any combination thereof.

In some embodiments, the associative silane comprises or is selected from the group consisting of methacryloxypropyltrimethoxysilane, mercaptopropyltrimethoxysilane methacryloxypropylmethyldimethoxysilane, diphenyldimethoxysilane, an epoxy silane oligomer, or any combination thereof.

In some embodiments, the associative silane comprises or is selected from the group consisting of glycidoxypropyltrimethoxysilane, aminoethylaminopropyltrimethoxysilane, or any combination thereof.

In some embodiments, the associative silane comprises, consists, or consists essentially of glycidoxypropyltrimethoxysilane.

In some embodiments, the associative silane comprises, consists, or consists essentially of aminoethylaminopropyltrimethoxysilane.

In some embodiments, the non-associative silane is octylsilane.

In some embodiments, the non-associative silane comprises or is selected from the group consisting of octyltrimethoxysilane, vinyltrimethoxysilane, or any combination thereof.

In some embodiments, the non-associative silane is vinyltrimethoxysilane.

In some embodiments, the non-associative silane is octyltrimethoxysilane.

In some embodiments, the roofing putty comprises at least one bipodal silane. Non-limiting examples of a bipodal silane include bis(trimethoxysilylpropyl)amine (commercially available as Andisil® 1170) and bis[3-(triethoxysilyl)propyl] tetrasulfide (commercially available as Andisil® 1289).

In some embodiments, the roofing putty does not comprise a bipodal silane.

In some embodiments, the roofing putty may exclude certain specific bipodal silanes. For instance, in some embodiments, the roofing putty does not comprise bis(triethoxysilyl)ethane, bis(trimethoxysilylpropyl)amine, bis[3-(triethoxysilyl)propyl] tetrasulfide, or any combination thereof.

In some embodiments, the roofing putty does not comprise more than a specified amount of a bipodal silane. In some embodiments, the roofing putty does not comprise a bipodal silane in an amount exceeding 5 wt % based on a total weight of the roofing putty. In some embodiments, the roofing putty does not comprise a bipodal silane in an amount exceeding 4 wt % based on a total weight of the roofing putty. In some embodiments, the roofing putty does not comprise a bipodal silane in an amount exceeding 3 wt % based on a total weight of the roofing putty. In some embodiments, the roofing putty does not comprise a bipodal silane in an amount exceeding 2 wt % based on a total weight of the roofing putty. In some embodiments, the roofing putty does not comprise a bipodal silane in an amount exceeding 1 wt % based on a total weight of the roofing putty. In some embodiments, the roofing putty does not comprise a bipodal silane in an amount exceeding 0.5 wt % based on a total weight of the roofing putty. In some embodiments, the roofing putty does not comprise a bipodal silane in an amount exceeding 0.25 wt % based on a total weight of the roofing putty. In some embodiments, the roofing putty does not comprise a bipodal silane in an amount exceeding 0.1 wt % based on a total weight of the roofing putty.

Turning to the at least one filler, in some embodiments, the at least one filler in is present in the roofing putty in an amount ranging from 10% to 50 wt % based on a total weight of the roofing putty. In some embodiments, the at least one filler in is present in the roofing putty in an amount ranging from 20% to 50 wt % based on a total weight of the roofing putty. In some embodiments, the at least one filler in is present in the roofing putty in an amount ranging from 30% to 50 wt % based on a total weight of the roofing putty. In some embodiments, the at least one filler in is present in the roofing putty in an amount ranging from 40% to 50 wt % based on a total weight of the roofing putty.

In some embodiments, the at least one filler in is present in the roofing putty in an amount ranging from 10% to 40 wt % based on a total weight of the roofing putty. In some embodiments, the at least one filler in is present in the roofing putty in an amount ranging from 10% to 30 wt % based on a total weight of the roofing putty. In some embodiments, the at least one filler in is present in the roofing putty in an amount ranging from 10% to 20 wt % based on a total weight of the roofing putty.

In some embodiments, the at least one filler in is present in the roofing putty in an amount ranging from 20% to 40 wt % based on a total weight of the roofing putty. In some embodiments, the at least one filler in is present in the roofing putty in an amount ranging from 20% to 30 wt % based on a total weight of the roofing putty. In some embodiments, the at least one filler in is present in the roofing putty in an amount ranging from 30% to 40 wt % based on a total weight of the roofing putty.

In some embodiments, the at least one filler comprises or is selected from the group consisting of a reinforcing filler, a space filler, or any combination thereof.

As used herein a "reinforcing filler" is a filler that affects at least one mechanical property of the roofing putty. Non-limiting examples of the at least one mechanical property include tensile strength and tear, as described herein.

As used herein, a "space filler" is any filler that is used to increase volume of the roofing putty. In some embodiments, a space filler may be used to lower costs of manufacturing a roofing putty described herein.

In some embodiments, the reinforcing filler comprises or is selected from the group consisting of fumed silica, micro-cellulose fibers, or any combination thereof. In some embodiments, the reinforcing filler comprises or is selected from the group consisting of ground silica, polymer fibers, kaolin, or any combination thereof. In some embodiments, the reinforcing filler comprises or is selected from the group consisting of fumed silica, micro-cellulose fibers, silica, polymer fibers, kaolin, or any combination thereof.

In some embodiments, the space filler comprises or is selected from the group consisting of polymer microspheres, sand, granules, extended perlite, expanded polystyrene, beads, saw dust, flyash, pulp, polymer grains, polymer flakes, rice hulls, hollow glass microspheres, or any combination thereof. In some embodiments, the space filler comprises or is selected from the group consisting of polymer microspheres, sand, granules, extended perlite, expanded polystyrene, beads, saw dust, flyash, pulp, polymer grains, polymer flakes, rice hulls, or any combination thereof.

In some embodiments, the space filler comprises, consists of, or consists essentially of hollow glass microspheres.

In some embodiments, the hollow glass microspheres have an average particle size ranging from 1 micron to 200 microns. In some embodiments, the hollow glass microspheres have an average particle size ranging from 25 microns to 200 microns. In some embodiments, the hollow glass microspheres have an average particle size ranging from 50 microns to 200 microns. In some embodiments, the hollow glass microspheres have an average particle size ranging from 75 microns to 200 microns. In some embodiments, the hollow glass microspheres have an average particle size ranging from 100 microns to 200 microns. In some embodiments, the hollow glass microspheres have an average particle size ranging from 125 microns to 200 microns. In some embodiments, the hollow glass microspheres have an average particle size ranging from 150 microns to 200 microns. In some embodiments, the hollow glass microspheres have an average particle size ranging from 175 microns to 200 microns.

In some embodiments, the hollow glass microspheres have an average particle size ranging from 1 micron to 175 microns. In some embodiments, the hollow glass microspheres have an average particle size ranging from 1 micron to 150 microns. In some embodiments, the hollow glass microspheres have an average particle size ranging from 1 micron to 125 microns. In some embodiments, the hollow glass microspheres have an average particle size ranging from 1 micron to 100 microns. In some embodiments, the hollow glass microspheres have an average particle size ranging from 1 micron to 75 microns. In some embodiments, the hollow glass microspheres have an average particle size ranging from 1 micron to 50 microns. In some embodiments, the hollow glass microspheres have an average particle size ranging from 1 micron to 25 microns.

In some embodiments, the hollow glass microspheres have an average particle size ranging from 25 microns to 175 microns. In some embodiments, the hollow glass microspheres have an average particle size ranging from 50 microns to 150 microns.

In some embodiments, the at least one filler and the at least one silane are present in the roofing putty in a weight ratio of the at least one filler to the at least one silane ranging from 1:1 to 3:1. In some embodiments, the at least one filler and the at least one silane are present in the roofing putty in a weight ratio of the at least one filler to the at least one silane ranging from 3:2 to 3:1. In some embodiments, the at least one filler and the at least one silane are present in the roofing putty in a weight ratio of the at least one filler to the at least one silane ranging from 2:1 to 3:1. In some embodiments, the at least one filler and the at least one silane are present in the roofing putty in a weight ratio of the at least one filler to the at least one silane ranging from 5:2 to 3:1.

In some embodiments, the at least one filler and the at least one silane are present in the roofing putty in a weight ratio of the at least one filler to the at least one silane ranging from 1:1 to 5:2. In some embodiments, the at least one filler and the at least one silane are present in the roofing putty in a weight ratio of the at least one filler to the at least one silane ranging from 1:1 to 2:1. In some embodiments, the at least one filler and the at least one silane are present in the roofing putty in a weight ratio of the at least one filler to the at least one silane ranging from 1:1 to 3:2.

In some embodiments, the at least one filler and the at least one silane are present in the roofing putty in a weight ratio of the at least one filler to the at least one silane ranging from 3:2 to 5:2. In some embodiments, the at least one filler and the at least one silane are present in the roofing putty in a weight ratio of the at least one filler to the at least one silane ranging from 2:1 to 5:2.

In some embodiments, the at least one filler and the at least one associative silane are present in the roofing putty in a weight ratio of the at least one filler to the at least one associative silane ranging from 5:1 to 15:1. In some embodiments, the at least one filler and the at least one associative silane are present in the roofing putty in a weight ratio of the at least one filler to the at least one associative silane ranging from 7:1 to 15:1. In some embodiments, the at least one filler and the at least one associative silane are present in the roofing putty in a weight ratio of the at least one filler to the at least one associative silane ranging from 9:1 to 15:1. In some embodiments, the at least one filler and the at least one associative silane are present in the roofing putty in a weight ratio of the at least one filler to the at least one associative silane ranging from 11:1 to 15:1. In some embodiments, the at least one filler and the at least one associative silane are present in the roofing putty in a weight ratio of the at least one filler to the at least one associative silane ranging from 13:1 to 15:1.

In some embodiments, the at least one filler and the at least one associative silane are present in the roofing putty in a weight ratio of the at least one filler to the at least one associative silane ranging from 5:1 to 13:1. In some embodiments, the at least one filler and the at least one associative silane are present in the roofing putty in a weight ratio of the at least one filler to the at least one associative silane ranging from 5:1 to 11:1. In some embodiments, the at least one filler and the at least one associative silane are present in the roofing putty in a weight ratio of the at least one filler to the at least one associative silane ranging from 5:1 to 9:1. In some embodiments, the at least one filler and the at least one associative silane are present in the roofing putty in a weight ratio of the at least one filler to the at least one associative silane ranging from 5:1 to 7:1.

In some embodiments, the at least one filler and the at least one associative silane are present in the roofing putty in a weight ratio of the at least one filler to the at least one associative silane ranging from 7:1 to 13:1. In some embodiments, the at least one filler and the at least one associative silane are present in the roofing putty in a weight ratio of the at least one filler to the at least one associative silane ranging from 9:1 to 11:1.

In some embodiments, a weight ratio of the at least one filler to the at least one non-associative silane in the roofing putty is from 1:1 to 5:1. In some embodiments, a weight ratio of the at least one filler to the at least one non-associative silane in the roofing putty is from 2:1 to 5:1. In some embodiments, a weight ratio of the at least one filler to the at least one non-associative silane in the roofing putty is from 3:1 to 5:1. In some embodiments, a weight ratio of the at least one filler to the at least one non-associative silane in the roofing putty is from 4:1 to 5:1.

In some embodiments, a weight ratio of the at least one filler to the at least one non-associative silane in the roofing putty is from 1:1 to 4:1. In some embodiments, a weight ratio of the at least one filler to the at least one non-associative silane in the roofing putty is from 1:1 to 3:1. In some embodiments, a weight ratio of the at least one filler to the at least one non-associative silane in the roofing putty is from 1:1 to 2:1.

In some embodiments, a weight ratio of the at least one filler to the at least one non-associative silane in the roofing putty is from 2:1 to 4:1. In some embodiments, a weight ratio of the at least one filler to the at least one non-associative silane in the roofing putty is from 2:1 to 3:1. In some embodiments, a weight ratio of the at least one filler to the at least one non-associative silane in the roofing putty is from 3:1 to 4:1.

In some embodiments, the roofing putty further comprises at least one crosslinker.

In some embodiments, the at least one crosslinker is present in an amount of 0.1 wt % to 5 wt % based on a total weight of the roofing putty. In some embodiments, the at least one crosslinker is present in an amount of 0.5 wt % to 5 wt % based on a total weight of the roofing putty. In some embodiments, the at least one crosslinker is present in an amount of 1 wt % to 5 wt % based on a total weight of the roofing putty. In some embodiments, the at least one crosslinker is present in an amount of 2 wt % to 5 wt % based on a total weight of the roofing putty. In some embodiments, the at least one crosslinker is present in an amount of 3 wt % to 5 wt % based on a total weight of the roofing putty. In some embodiments, the at least one crosslinker is present in an amount of 4 wt % to 5 wt % based on a total weight of the roofing putty.

In some embodiments, the at least one crosslinker is present in an amount of 0.1 wt % to 4 wt % based on a total weight of the roofing putty. In some embodiments, the at least one crosslinker is present in an amount of 0.1 wt % to 5 wt % based on a total weight of the roofing putty. In some embodiments, the at least one crosslinker is present in an amount of 0.1 wt % to 3 wt % based on a total weight of the roofing putty. In some embodiments, the at least one crosslinker is present in an amount of 0.1 wt % to 2 wt % based on a total weight of the roofing putty. In some embodiments, the at least one crosslinker is present in an amount of 0.1 wt % to 1 wt % based on a total weight of the roofing putty. In some embodiments, the at least one crosslinker is present in an amount of 0.1 wt % to 0.5 wt % based on a total weight of the roofing putty.

In some embodiments, the at least one crosslinker is present in an amount of 0.5 wt % to 4 wt % based on a total weight of the roofing putty. In some embodiments, the at least one crosslinker is present in an amount of 1 wt % to 2 wt % based on a total weight of the roofing putty.

In some embodiments, the roofing putty may further comprise at least one additive. In some embodiments, the at least one additive comprises or is selected from the group consisting of at least one pigment, at least one reactive diluent, at least one catalyst, at least one adhesion promoter, or any combination thereof.

In some embodiments, the roofing putty exhibits an elongation ranging from 90% to 500%, tested according to ASTM D2370. In some embodiments, the roofing putty exhibits an elongation ranging from 100% to 500%, tested according to ASTM D2370. In some embodiments, the roofing putty exhibits an elongation ranging from 200% to 500%, tested according to ASTM D2370. In some embodiments, the roofing putty exhibits an elongation ranging from 300% to 500%, tested according to ASTM D2370. In some embodiments, the roofing putty exhibits an elongation ranging from 400% to 500%, tested according to ASTM D2370. In some embodiments, the roofing putty exhibits an elongation ranging from 490% to 500%, tested according to ASTM D2370.

In some embodiments, the roofing putty exhibits an elongation ranging from 90% to 490%, tested according to ASTM D2370. In some embodiments, the roofing putty exhibits an elongation ranging from 90% to 300%, tested according to ASTM D2370. In some embodiments, the roofing putty exhibits an elongation ranging from 90% to 200%, tested according to ASTM D2370. In some embodiments, the roofing putty exhibits an elongation ranging from 90% to 100%, tested according to ASTM D2370.

In some embodiments, the roofing putty exhibits an elongation ranging from 100% to 490%, tested according to ASTM D2370. In some embodiments, the roofing putty exhibits an elongation ranging from 200% to 400%, tested according to ASTM D2370. In some embodiments, the roofing putty exhibits an elongation ranging from 200% to 300%, tested according to ASTM D2370. In some embodiments, the roofing putty exhibits an elongation ranging from 300% to 400%, tested according to ASTM D2370.

In some embodiments, the roofing putty exhibits a tensile strength ranging from 100 psi to 1000 psi, tested according to ASTM D2370. In some embodiments, the roofing putty exhibits a tensile strength ranging from 100 psi to 1000 psi, tested according to ASTM D2370. In some embodiments, the roofing putty exhibits a tensile strength ranging from 300 psi to 1000 psi, tested according to ASTM D2370. In some embodiments, the roofing putty exhibits a tensile strength ranging from 500 psi to 1000 psi, tested according to ASTM D2370. In some embodiments, the roofing putty exhibits a tensile strength ranging from 700 psi to 1000 psi, tested according to ASTM D2370. In some embodiments, the roofing putty exhibits a tensile strength ranging from 900 psi to 1000 psi, tested according to ASTM D2370.

In some embodiments, the roofing putty exhibits a tensile strength ranging from 100 psi to 900 psi, tested according to ASTM D2370. In some embodiments, the roofing putty exhibits a tensile strength ranging from 100 psi to 700 psi, tested according to ASTM D2370. In some embodiments, the roofing putty exhibits a tensile strength ranging from 100 psi to 500 psi, tested according to ASTM D2370. In some embodiments, the roofing putty exhibits a tensile strength ranging from 100 psi to 300 psi, tested according to ASTM D2370.

In some embodiments, the roofing putty exhibits a tensile strength ranging from 300 psi to 900 psi, tested according to ASTM D2370. In some embodiments, the roofing putty exhibits a tensile strength ranging from 500 psi to 700 psi, tested according to ASTM D2370.

In some embodiments, the roofing putty exhibits a tear ranging from 25 lbf/in to 100 lbf/in, tested according to ASTM D624. In some embodiments, the roofing putty exhibits a tear ranging from 50 lbf/in to 100 lbf/in, tested according to ASTM D624. In some embodiments, the roofing putty exhibits a tear ranging from 75 lbf/in to 100 lbf/in, tested according to ASTM D624.

In some embodiments, the roofing putty exhibits a tear ranging from 25 lbf/in to 75 lbf/in, tested according to ASTM D624. In some embodiments, the roofing putty exhibits a tear ranging from 25 lbf/in to 50 lbf/in, tested according to ASTM D624.

In some embodiments, the roofing putty exhibits a tear ranging from 50 lbf/in to 75 lbf/in, tested according to ASTM D624.

Some embodiments of the present disclosure relate to a system comprising the roofing putty and at least one roof substrate. In some embodiments, the roofing putty is disposed on the at least one roof substrate.

In some embodiments the at least one roof substrate comprises at least a first roof substrate and a second roof substrate.

In some embodiments, the second roof substrate is parallel to the first roof substrate. In some embodiments, the roofing putty is disposed between the second roof substrate and the first roof substrate. In some embodiments, the roofing putty forms a bond between the second roof substrate and the first roof substrate.

In some embodiments, the second roof substrate is coplanar with the first roof substrate. In some embodiments, the first roof substrate is transverse to a protruding member, wherein the roofing putty is present on an interface between the second roof substrate and the first roof substrate. In some embodiments, the second roof substrate is coplanar with or transverse to the first roof substrate. In some embodiments, the roofing putty is present on an interface between the second roof substrate and the first roof substrate. In some embodiments, the roofing putty seals the interface between the second roof substrate and the first roof substrate.

In some embodiments, the first roof substrate, the second roof substrate, a third roof substrate, a fourth roof substrate, a fifth roof substrate, any number of additional roof substrates, or any combination thereof, comprises, consists of, or consists essentially of a plywood roof substrate, a glass roof substrate, a cellulosic roof substrate, at least one roofing shingle, a glass mat, a fiberglass mat, an underlayment, a roofing membrane, a roof deck, a photovoltaic (PV) panel, a modified bitumen (MODBIT) substrate, a roll good, a board (such as but not limited to a foam board (e.g., a polyisocyanurate (ISO) foam board), a cover board, any combination thereof), a base sheet, or any combination thereof.

In some embodiments, a protruding member can include a chimney, a pipe, any combination thereof, or the like.

In some embodiments, the first roof substrate, the second roof substrate, the third roof substrate, the fourth roof substrate, the fifth roof substrate, any number of additional roof substrates, or any combination thereof, may further comprise at least one coating layer, where the coating layer is disposed on the first roof substrate, the second roof substrate, or any combination thereof. In some embodiments, the at least one coating layer is disposed between the at least one roofing putty and the first roof substrate. In some embodiments, the at least one coating layer is disposed between the at least one roofing putty and the second roof substrate.

In some embodiments, the at least one coating layer comprises at least one layer of adhesive. In some embodiments, the at least one coating layer may comprise polysiloxane, polyurea, polyurethane, silane modified ether, silane modified ester, silane modified polyurethane, silane modified polyurea, epoxy resin, acrylic resin, polyacrylic resin, any precursor thereof, or any combination thereof. In some embodiments, the at least one coating layer comprises a plurality of coating layers.

Some embodiments of the present disclosure relate to a method of using the roofing putty. In some embodiments the method of using the roofing putty comprises installing the roofing putty on at least one roof substrate. Some embodiments of the present disclosure relate to a method of using the roofing putty. In some embodiments the method of using the roofing putty comprises installing the roofing putty on at least two roof substrates.

In some embodiments, the method may include installing the roofing putty on any number of roof substrates and protruding members, such as but not limited to, a third roof substrate, a fourth roof substrate, a fifth roof substrate, and so on. In some embodiments, the method may comprise installing the roofing putty may be disposed on any of the roof substrates or any combination thereof.

In some embodiments the at least one roof substrate comprises a first roof substrate and a second roof substrate. In some embodiments, the second roof substrate is parallel to the first roof substrate. In some embodiments, the method further comprises sandwiching the roofing putty between the first roof substrate and a second roof substrate. In some embodiments, sandwiching the roofing putty between the first roof substrate and the second roof substrate bonds the first roof substrate to the second roof substrate.

In some embodiments, the second roof substrate is coplanar with the first roof substrate. In some embodiments, the protruding member is transverse to the first roof substrate. In some embodiments, the method further comprises disposing the roofing putty at least on an interface between the first roof substrate and a second roof substrate, a protruding member, or any combination thereof. In some embodiments, disposing the roofing putty on the interface forms a seal at the interface between the first roof substrate, the second roof substrate, the protruding member, or any combination thereof.

In some embodiments, the roofing system comprises a plurality of roof substrates, each of which may be disposed relative to each other at any angle. For instance, in some embodiments, the plurality of roof substrates and the protruding member or protruding members may be transverse to each other, perpendicular to each other, coplanar to each other, parallel to each other, or any combination thereof.

In some embodiments, the roofing system may comprise any number of additional roof substrates, such as but not limited to, a third roof substrate, a fourth roof substrate, a fifth roof substrate, and so on. The additional roof substrates may be disposed relative to each other at any angle or combination of angles as described herein. In some embodiments, the roofing putty may be disposed on any of the roof substrates or any combination thereof.

A non-limiting exemplary embodiment of a roofing system is shown in FIG. 1. As shown, the non-limiting example roof system 100 of FIG. 1 may include a roof substrate 101, a roof substrate 102, and a roof substrate 103. As shown, the roof substrate 101 may be coplanar with the roof substrate 102. In some non-limiting embodiments, the roof substrate 103 may be perpendicular to the first and second roof substrates 101 and 102 respectively. While the roof substrates 101, 102, and 103 shown in FIG. 1 are plywood roof substrates, any or all of the roof substrates 101, 102, or 103 can be any material described herein. Additionally, some non-limiting examples of the roof system 100 may also include at least one interface 104 between the roof substrate 101 and the roof substrate 102. As shown, in some embodiments, a roofing putty 105 may be disposed on the interface between the roof substrate 101 and the roof substrate 102. In some embodiments, a roofing putty 105 may define a seal on the interface between the roof substrate 101 and the roof substrate 102. In some embodiments, the roofing putty 105 may also be disposed on the roof substrate 103.

Figure 2:
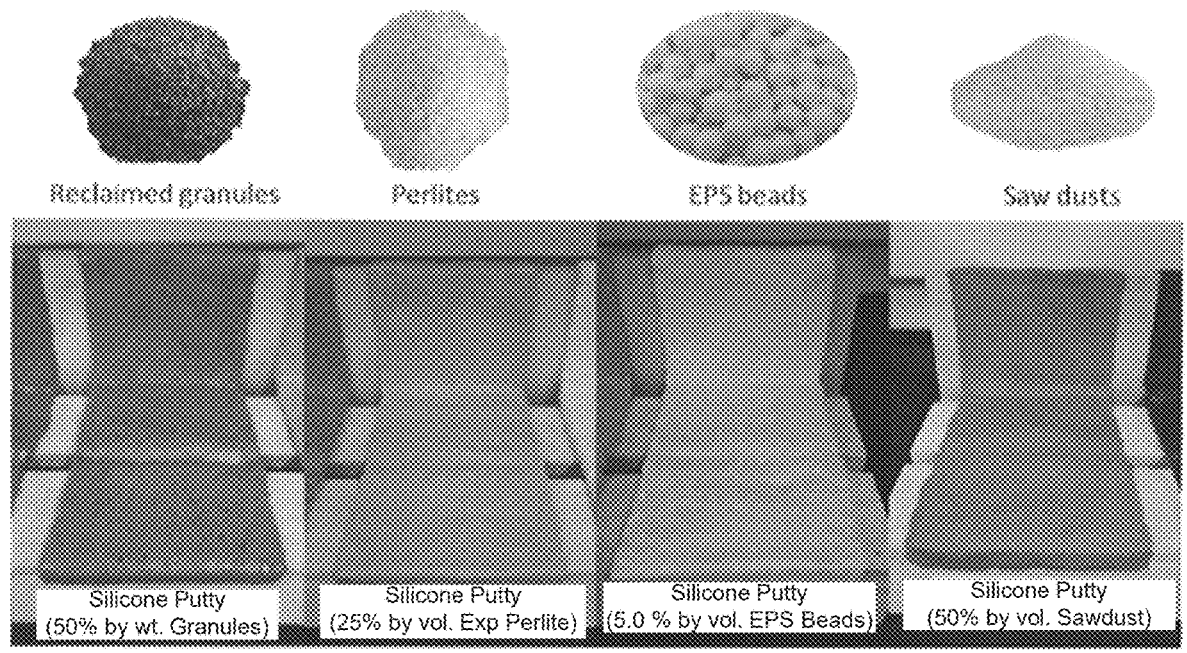
FIG. 2 depicts a non-limiting embodiment of a roofing system including a roofing putty.

Additional non-limiting exemplary embodiments of the roofing putty and roofing system described herein are shown in FIG. 2. As shown, in some embodiments, the roofing putty may be modified in at least one respect by varying the type of the at least one filler. For instance, in some embodiments as shown in FIG. 2, the aesthetic appearance of the roofing putty, such as but not limited to the color of the roofing putty, may be modified by varying the type of the at least one filler.

Figure 3A:
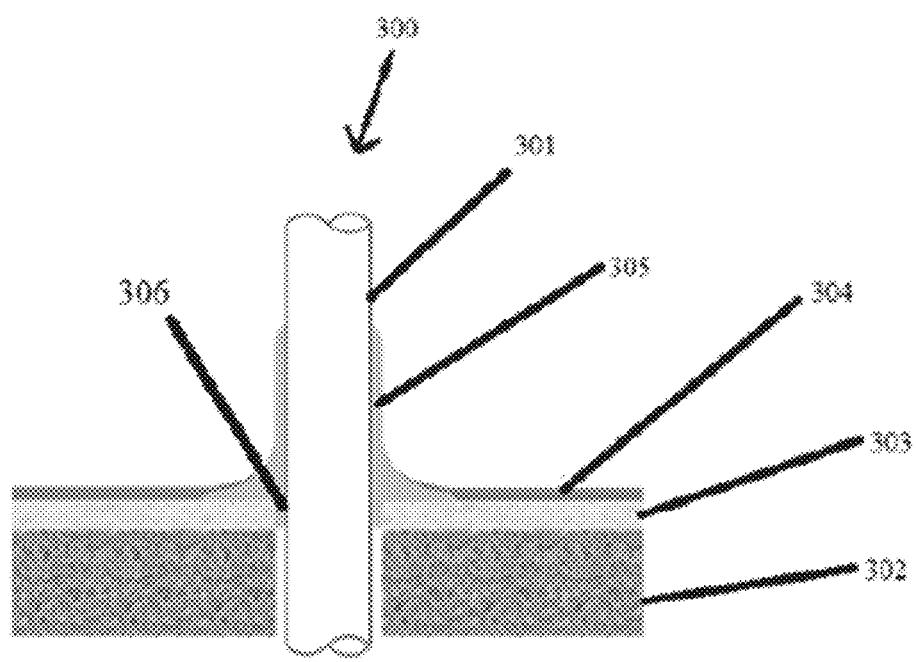
FIGS. 3A-3C depict non-limiting embodiments of a roofing system including a roofing putty.
Figure 3B:
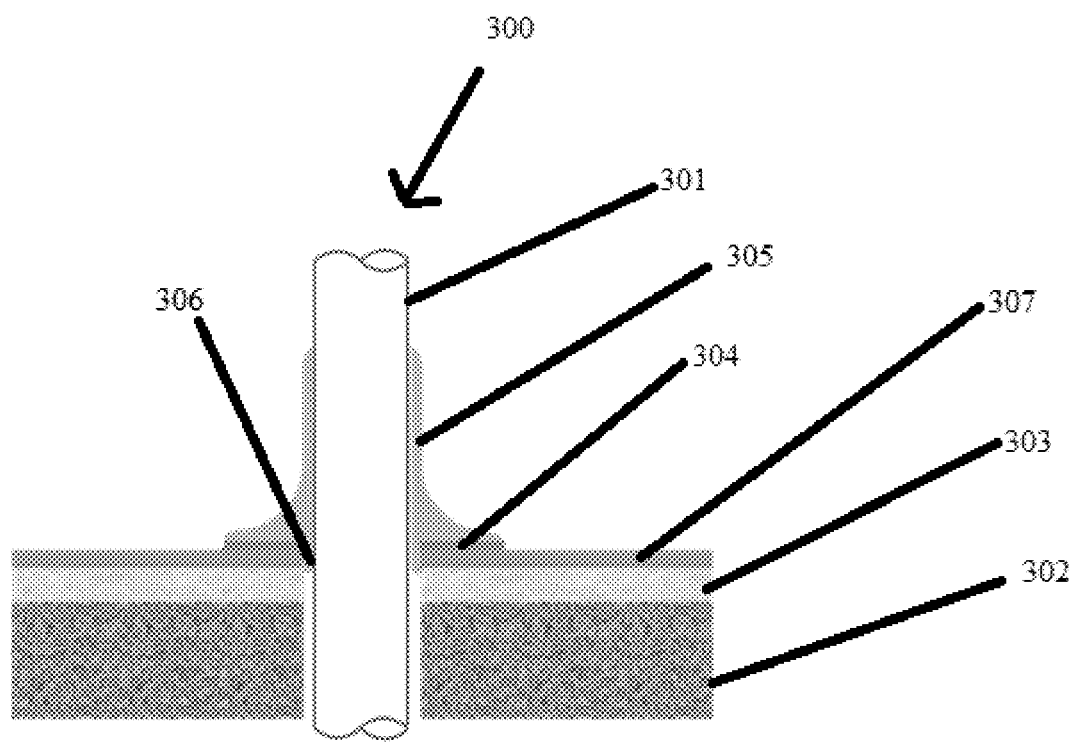
Figure 3C:
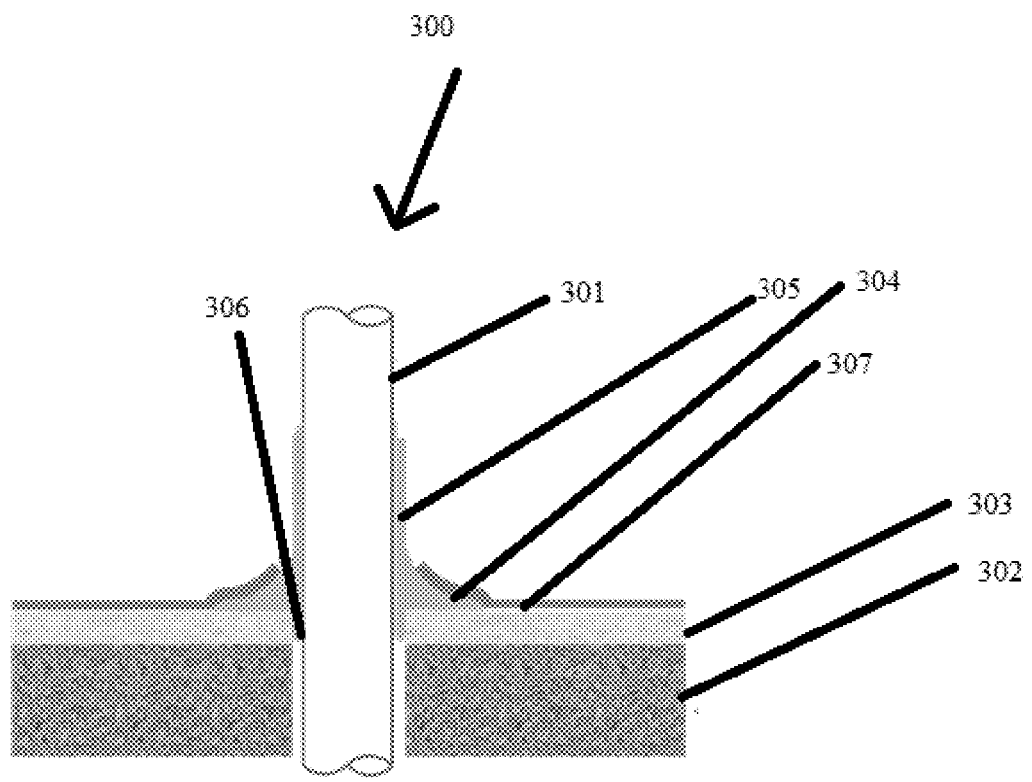

Additional exemplary non-limiting embodiments of a roofing system of the present disclosure are shown in FIGS. 3A to 3C. As shown, a non-limiting example roofing system 300 may include a protruding member 301, which as shown in the non-limiting embodiment of FIGS. 3A to 3C, may take the form of a pipe. As further shown in the non-limiting embodiment of FIGS. 3A to 3C, roofing system 300 may further comprise a roof substrate 302. In some embodiments, roof substrate 302 may be perpendicular to the protruding member 301. In some embodiments, the roofing system 300 may comprise a roof substrate 303, which as shown in FIGS. 3A to 3C may be parallel to roof substrate 302. In some embodiments, roof substrate 303 may be disposed directly atop roof substrate 302. In some embodiments, the roof substrate 303 may take the form of a foam board (e.g., an ISO board), a cover-board, a base sheet, or any combination thereof.

In some embodiments, as shown in FIGS. 3A to 3C, an interface 306 may be present between the protruding member 301 and roof substrates 302 and 303. As shown, in some embodiments, roofing putty 305 may in some embodiments of roofing system 300, form a seal on the interface 306.

In some embodiments, such as the embodiment of FIG. 3A, the roofing system 300 may further include at least one coating layer 304. As shown in FIG. 3A, in some embodiments, at least a portion of the at least one coating layer 304 may be disposed between the roofing putty 305 and the roof substrate 303.

In some embodiments, such as the embodiments of FIGS. 3B and 3C, the roofing system 300 may further include a roof substrate 307. In some embodiments, the roof substrate 307 may take the form of a roofing membrane. In some embodiments, as shown, for example, in FIGS. 3B and 3C, the roof substrate 303 may be disposed between the roof substrate 302 and the roof substrate 307.

In some embodiments, such as the embodiment of FIG. 3B, the at least one coating layer 304 (which may comprise at least one adhesive layer) may be disposed between the roof substrate 307 and the roofing putty 305, with the roofing putty 305 covering the roof substrate 307 and at least a portion of the at least one coating layer 304.

In some embodiments, such as the embodiment of FIG. 3C, at least a portion of the at least one coating layer 304 (which may include at least one adhesive layer) may be disposed between the roof substrate 307 and the roofing putty 305, with the roof substrate 307 covering the at least one coating layer 304 and the roofing putty 305.

Figure 4:
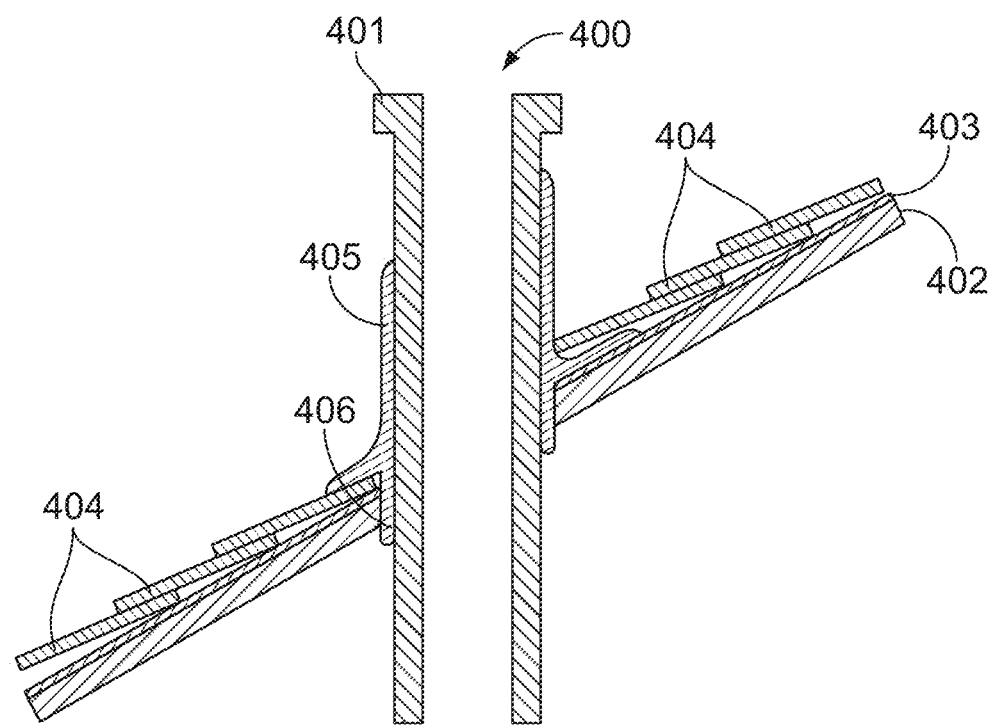
FIG. 4 depicts a non-limiting embodiment of a roofing system including a roofing putty.

A further non-limiting embodiment of the present disclosure is shown in FIG. 4. As shown, the non-limiting example roofing system 400 may include a protruding member 401, which as shown in the non-limiting embodiment of FIG. 4, may take the form of a chimney. As shown in the non-limiting embodiment of FIG. 4, roofing system 400 may further include a roof substrate 402. As shown, in some embodiments, the roof substrate 402 may be transverse to protruding member 401. In some embodiments, the roofing system 400 may include a roof substrate 403, which as shown in FIG. 4 may be parallel to the roof substrate 402. In some embodiments, the roof substrate 403 may be disposed directly atop the roof substrate 402. In some embodiments, the roof substrate 403 may take the form of an underlayment.

In some embodiments, the roofing system 400 may further include at least one roof substrate 404. In some embodiments, as shown in FIG. 4, the at least one roof substrate 404 may take the form of at least one roofing shingle or a plurality of roofing shingles. In some embodiments, roofing putty 405 may be present between the at least one roof substrate 404 and the roof substrate 403.

In some embodiments, as further shown in FIG. 4, an interface 406 may be present between the protruding member 401 and the roof substrates 402, 403, and 404. As shown, in some embodiments, roofing putty 405 may in some embodiments of roofing system 400, form a seal on the interface 406.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim. For instance, in some non-limiting embodiments, a claim reciting "consisting essentially of" may allow for addition of any non-recited components that do not alter values of at least one mechanical property (e.g., tensile strength, elongation, or tear) of the roofing putty recited by a specific claim.

As used herein, terms such as "consisting of" and "composed of" limit the scope of a specific claim to the materials and steps recited by the claim.

EXAMPLES

Example 1

Non-limiting examples of the roofing putty formulations were prepared. With the exception of the at least one crosslinker, which in exemplary roofing putty formulations 1 to 9 was dimethyltin dineodecanoate, diisopropoxy-bis-ethylacetoacetatotitanate, or a combination thereof, the components of exemplary roofing putty formulations 1 to 9 were combined and mixed for 1 hour.

The at least one crosslinker was then added and thoroughly mixed with the other components to form the final roofing putty formulations, which are shown in Tables 1A to 3A below.

TABLE 1A

| Component | Formulation 1 (wt %) | Formulation 2 (wt %) | Formulation 3 (wt %) |
|---|---|---|---|
| Aminoethylaminopropyltrimethoxysilane | 1% | 1% | 1% |
| Glycidoxypropyltrimethoxysilane | 1% | 1% | 1% |
| Octyltrimethoxysilane | 6% | 6% | 6% |
| Microcellulose fiber 200 μm | 4% | 4% | 4% |
| Fumed silica | 6% | 2% | 6% |
| Hollow glass sphere | 8% | 16% | 8% |
| Mono trimethoxy terminated polysiloxane, 100 cps | | 10% | 10% |
| Silanol terminated polysiloxane, 70 cps | 10% | 0% | 0% |
| Silanol terminated polysiloxane, 80000 cps | 60% | 56% | 60% |
| $TiO_2$ or other pigments | 2% | 2% | 0% |
| Dimethyltin dineodecanoate | 0.1% | 0% | 0.1% |
| Diisopropoxy-bisethylacetoacetatotitanate | 2% | 2% | 2% |

TABLE 2A

| Component | Formulation 4 (wt %) | Formulation 5 (wt %) | Formulation 6 (wt %) |
|---|---|---|---|
| Aminoethylaminopropyltrimethoxysilane | 1% | 1% | 1% |
| Glycidoxypropyltrimethoxysilane | 1% | 1% | 1% |
| Octyltrimethoxysilane | 6% | 8% | 8% |
| Microcellulose fiber 200 μm | 4% | 4% | 4% |
| Fumed silica | 6% | 2% | 5% |
| Hollow glass sphere | 8% | 12% | 12% |
| Ground silica | 4% | 0% | 0% |
| Mono trimethoxy terminated polysiloxane, 100 cps | 10% | 10% | 10% |
| Silanol terminated polysiloxane, 80000 cps | 56% | 58% | 55% |
| $TiO_2$ or other pigments | 2% | 2% | 2% |
| Dimethyltin dineodecanoate | 0.1% | 0.1% | 0.1% |
| Diisopropoxy-bisethylacetoacetatotitanate | 1.9% | 1.9% | 1.9% |

TABLE 3A

| Component | Formulation 7 (wt %) | Formulation 8 (wt %) | Formulation 9 (wt %) |
|---|---|---|---|
| Aminoethylaminopropyltrimethoxysilane | 1% | 1% | 1% |
| Glycidoxypropyltrimethoxysilane | 1% | 1% | 1% |
| Octyltrimethoxysilane | 8% | 8% | 8% |
| Microcellulose fiber 200 μm | 4% | 4% | 8% |
| Fumed silica | 5% | 5% | 5% |
| Hollow glass sphere | 8% | 16% | 12% |
| Mono trimethoxy terminated polysiloxane, 100 cps | 10% | 10% | 10% |
| Silanol terminated polysiloxane, 80000 cps | 59% | 51% | 51% |
| $TiO_2$ or other pigments | 2% | 2% | 2% |
| Dimethyltin dineodecanoate | 0.1% | 0.1% | 0.1% |
| Diisopropoxy-bisethylacetoacetatotitanate | 1.9% | 1.9% | 1.9% |

Comparative formulations 1 and 2 were also prepared using the same procedure as outlined above. Comparative formulations 1 and 2 are shown below in Table 4A.

TABLE 4A

| Component | Comparative formulation 1 (wt %) | Comparative formulation 2 (wt %) |
|---|---|---|
| Aminoethylaminopropyltrimethoxysilane | 4% | 1% |
| Bis(trimethoxysilylpropyl)amine | 0% | 3% |
| Hollow glass spheres | 16% | 16% |
| Methyl tris(MEKO)silane | 2% | 2% |
| Silanol terminated polysiloxane, 20000 cps | 30% | 30% |
| Silanol terminated polysiloxane, 70 cps | 10% | 10% |
| Silanol terminated polysiloxane, 80000 cps | 36% | 36% |
| $TiO_2$ or other pigments | 2% | 2% |
| Dimethyltin dineodecanoate | 0.2% | 0.2% |

Exemplary roofing putty formulations 1 to 9 and comparative formulations 1 to 2 were tested and evaluated for specific properties. Specifically, roofing putty formulations 1 to 9 and comparative formulations 1 to 2 were tested under ASTM D2370 for tensile strength and elongation and also under ASTM D624 for tear. Consistency and stability were evaluated after 12 to 24 hours storage in a container filled with nitrogen. Consistency, i.e., whether or not a given formulation is or is not a "putty," was further determined based on whether the formulation met the definition described herein, infra. Curability was evaluated by observing whether a film was due to the roofing putty being left in ambient air. Results are shown in Tables 1B to 4B below.

TABLE 1B

| Properties | Formulation 1 | Formulation 2 | Formulation 3 |
|---|---|---|---|
| Tensile Strength (ASTM D2370) | 220.7 psi | 149.4 psi | 167.6 psi |
| Elongation (ASTM D2370) | 159.6% | 127.8% | 215.6% |
| Tear (ASTM D624) | 29.7 lbf/in | 27.6 lbf/in | 29.9 lbf/in |
| Consistency | Putty | Putty | Putty |
| Stability | Stable | Stable | Stable |
| Curability | Cure | Cure | Cure |

TABLE 2B

| Properties | Formulation 4 | Formulation 5 | Formulation 6 |
|---|---|---|---|
| Tensile Strength (ASTM D2370) | 196.8 psi | 128.8 psi | 168.3 psi |
| Elongation (ASTM D2370) | 220.7% | 147.5% | 156.3% |
| Tear (ASTM D624) | 32.5 lbf/in | 24.1 lbf/in | 30.9 lbf/in |
| Consistency | Putty | Putty | Putty |
| Stability | Stable | Stable | Stable |
| Curability | Cure | Cure | Cure |

TABLE 3B

| Properties | Formulation 7 | Formulation 8 | Formulation 9 |
|---|---|---|---|
| Tensile Strength (ASTM D2370) | 149.6 psi | 206.6 psi | 217.0 psi |
| Elongation (ASTM D2370) | 175.7% | 143.9% | 152.3% |
| Tear (ASTM D624) | 31.0 lbf/in | 34.6 lbf/in | 34.8 lbf/in |
| Consistency | Putty | Putty | Putty |
| Stability | Stable | Stable | Stable |
| Curability | Cure | Cure | Cure |

TABLE 4B

| Properties | Comparative formulation 1 | Comparative formulation 2 |
|---|---|---|
| Tensile Strength (ASTM D2370) | 146.9 psi | 234.0 psi |
| Elongation (ASTM D2370) | 80.9% | 97.0% |
| Tear (ASTM D624) | 24.9 lbf/in | 29.0 lbf/in |
| Consistency | Not Putty | Not Putty |
| Stability | Stable | Not Stable |
| Curability | Cure | Cure |

Example 2

Figure 5:
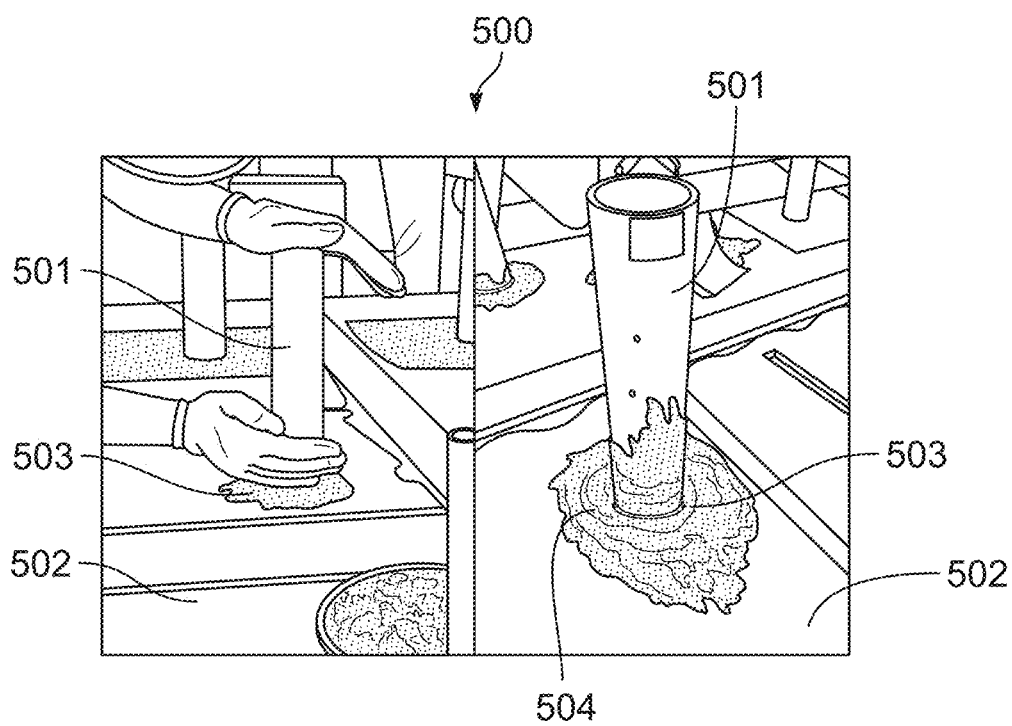
FIG. 5 depicts a non-limiting embodiment of a roofing system including a roofing putty.

As shown in FIG. 5, a non-limiting roofing system 500 according to at least some embodiments of the present disclosure was installed. Specifically, as shown in FIG. 5, roofing putty 503 was installed on an interface 504 between a protruding member 501 and a roof substrate 502. As shown in the present non-limiting example, the protruding member 501 was in the form of a pipe. As shown in the present non-limiting example, the protruding member 501 was perpendicular to the roof substrate 502.

In the present non-limiting example, a silicone coating layer (United Coatings™ Unisil HS—not visible in FIG. 5), was applied as a "top coat" over the roofing putty 503. Two formulations (see, Example 1 for formulation components) of the roofing putty 503 were tested for wet peel adhesion pursuant to ASTM D903 and ASTM C794 after applying the silicone top coat. This process was then repeated by varying time intervals between application of the roofing putty 503 and application of the silicone top coat. The purpose of varying the time intervals were to determine the effect of roofing putty cure time on the wet peel adhesion. Results are shown below in Table 5.

TABLE 5

Wet peel adhesion pursuant to ASTM D903 and ASTM C794 in pounds per linear inch (pli) with United Coatings™ Unisil HS as a Top Coat

| Putty Cure Time before application of the Top Coat: | Formulation 6 | Formulation 8 |
|---|---|---|
| 0 hr | >2 pli | >2 pli |
| 6 hr | >2 pli | >2 pli |
| 24 hr | >2 pli | >2 pli |
| 48 hr | >2 pli | >2 pli |

As illustrated above in Table 5, the roofing putty Formulations 6 and 8 of Example 1 achieved an acceptable wet peel adhesion of >2 pli as specified in ASTM D6694 when tested according to ASTM D903 and ASTM C794 at all tested time intervals.

Example 3

The roofing system according to at least some embodiments of the present disclosure was compared against several comparative roofing systems to illustrate exemplary improvements in installation time. Results are shown below in Table 6.

TABLE 6

| Roofing System No. | Description | Adhesive | Base flashing | Fabric prep | Flashing | Total (min) |
|---|---|---|---|---|---|---|
| Roofing System 1 | Silicone putty | | | | 1 | 1 |
| Comparative Roofing System 1 | Liquid flashing no fabric reinforcement | | | | 5 | 5 |
| Comparative Roofing System 2 | Liquid flashing with fabric reinforcement | | 2 | 8 | 10 | 20 |
| Comparative Roofing System 3 | Liquid flashing with adhesive | 7 | | | 3 | 10 |
| Comparative Roofing System 4 | Liquid flashing with sprayed adhesive, no fabric reinforcement | 0.2 | | | 5 | 5.2 |
| Comparative Roofing System 5 | Liquid flashing with sprayed adhesive, with fabric reinforcement | 0.2 | | 8 | 10 | 18.2 |

As shown, the exemplary Roofing System 1 exhibited a shorter installation time as compared to Comparative Roofing Systems 1-5.

All prior patents, publications, and test methods referenced herein are incorporated by reference in their entireties. Variations, modifications, and alterations to embodiments of the present disclosure described above will make themselves apparent to those skilled in the art. All such variations, modifications, alterations, and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A roofing system comprising:
   a first roof substrate;
   a protruding member,
      wherein the protruding member protrudes from the first roof substrate; and
   a roofing putty,
      wherein the roofing putty is located at an interface between the first roof substrate and the protruding member,
      wherein the roofing putty is a formulation consisting of:
         55% to 70% by weight of at least one polysiloxane based on a total weight of the roofing putty;
            wherein the at least one polysiloxane comprises at least one of a mono-trimethoxy terminated polysiloxane, a silanol terminated polysiloxane, or any combination thereof;
         at least one filler,
            wherein the at least one filler is selected from the group consisting of fumed silicas, micro-cellulose fibers, ground silicas, kaolins, hollow glass microspheres, sands, saw dusts, flyash, pulps, rice hulls, and any combination thereof;
         at least one silane,
            wherein the at least one silane comprises at least one of aminoethylaminopropyltrimethoxysilane, a glycidoxypropyltrimethoxysilane, an octyltrimethoxysilane, or any combination thereof;
            wherein a weight ratio of the at least one filler to the at least one silane is 1:1 to 3:1;
         at least one pigment; and
         at least one catalyst;
      wherein the roofing putty exhibits an elongation ranging from 100% to 500%, when tested according to ASTM D2370.

2. The roofing system of claim 1, further comprising a second roof substrate, wherein the second roof substrate is parallel to the first roof substrate,
wherein the roofing putty is disposed between the second roof substrate and the first roof substrate.

3. The roofing system of claim 1, wherein the protruding member is transverse to the first roof substrate.

4. The roofing system of claim 1, wherein the first roof substrate comprises at least one of a plywood roof substrate, a glass roof substrate, a cellulosic roof substrate, a roofing shingle, a glass mat, a fiberglass mat, an underlayment, a roofing membrane, a roof deck, a photovoltaic (PV) panel, a modified bitumen (MODBIT) substrate, a roll good, a polyisocyanurate (ISO) foam board, or any combination thereof.

5. The roofing system of claim 1, wherein the at least one polysiloxane has a viscosity of 70 cP to 300,000 cP when tested according to ASTM 2196 at a temperature of 20° C. to 25° C.

6. The roofing system of claim 1, wherein the at least one filler is present in an amount ranging from 15% to 30% by weight based on the total weight of the roofing putty.

7. The roofing system of claim 1, wherein the hollow glass microspheres have an average particle size of 1 micron to 200 microns.

8. A method comprising:
obtaining a roofing putty; and
disposing the roofing putty on a first roof substrate and a protruding member at an interface between the first roof substrate and the protruding member,
wherein the protruding member protrudes from the first roof substrate;
wherein the roofing putty is a formulation consisting of:
55% to 70% by weight of at least one polysiloxane based on a total weight of the roofing putty;
wherein the at least one polysiloxane comprises at least one of a mono-trimethoxy terminated polysiloxane, a silanol terminated polysiloxane, or any combination thereof; and
at least one filler,
wherein the at least one filler is selected from the group consisting of fumed silicas, micro-cellulose fibers, ground silicas, kaolins, hollow glass microspheres, sands, saw dusts, flyash, pulps, rice hulls, and any combination thereof;
at least one silane,
wherein the at least one silane comprises at least one of aminoethylaminopropyltrimethoxysilane, a glycidoxypropyltrimethoxysilane, an octyltrimethoxysilane, or any combination thereof;
wherein a weight ratio of the at least one filler to the at least one silane is 1:1 to 3:1;
at least one pigment; and
at least one catalyst;
wherein the roofing putty exhibits an elongation of 100% to 500%, when tested according to ASTM D2370.

9. The method of claim 8, further comprising sandwiching the roofing putty between the first roof substrate and a second roof substrate, wherein the second roof substrate is parallel to the first roof substrate.

10. The method of claim 9, wherein the protruding member is transverse to the first roof substrate.

* * * * *